United States Patent [19]

Mazzer

[11] 4,339,868
[45] Jul. 20, 1982

[54] PLASTIC TUBE ELEMENT MANUFACTURING APPARATUS

[75] Inventor: Giacomo Mazzer, Pontelambro, Italy

[73] Assignee: Mazzer Materie Plastiche, Como, Italy

[21] Appl. No.: 129,703

[22] Filed: Mar. 12, 1980

[30] Foreign Application Priority Data

Mar. 28, 1979 [IT] Italy ............................... 21376 A/79

[51] Int. Cl.³ .......................................... B23P 19/02
[52] U.S. Cl. .................................... 29/564.1; 29/237;
29/782; 29/819; 83/154; 83/212
[58] Field of Search ................. 29/237, 781, 782, 788,
29/789, 819, 820, 235, 33 T, 564.1, 564.2;
425/517, 296, 297; 83/154, 212, 159

[56] References Cited

U.S. PATENT DOCUMENTS

| | | | |
|---|---|---|---|
| 2,431,279 | 11/1947 | Remington et al. | 29/788 X |
| 2,735,473 | 2/1956 | Diget et al. | 29/237 X |
| 2,777,520 | 1/1957 | Grzenkowski et al. | 83/154 X |
| 2,940,164 | 6/1960 | Davis | 29/788 X |
| 2,986,192 | 5/1961 | Macleod | 29/819 |
| 3,083,750 | 4/1963 | Macleod | 29/237 |
| 3,267,783 | 8/1966 | Kepes | 83/154 X |
| 3,805,358 | 4/1974 | Lajovic | 29/782 X |
| 3,870,774 | 3/1975 | Maroschak | 425/296 |

FOREIGN PATENT DOCUMENTS

| | | | |
|---|---|---|---|
| 2413176 | 8/1979 | France | 29/237 |
| 382480 | 9/1973 | U.S.S.R. | 83/212 |
| 632534 | 11/1978 | U.S.S.R. | 29/237 |

*Primary Examiner*—William R. Briggs
*Attorney, Agent, or Firm*—Wenderoth, Lind & Ponack

[57] ABSTRACT

An apparatus for manufacturing plastic tubular elements with rubber or metal fittings at one or both ends, includes a conveyor for a plastic tube, a stop for metering a given length of the plastic tube, a cutter for cutting the length and a series of jaws for transferring the cut length to a least one head which automatically effects an axial mounting of a fitting over or within at least one end of tube length, after insertion of a core within the fitting and tube end bores.

8 Claims, 9 Drawing Figures

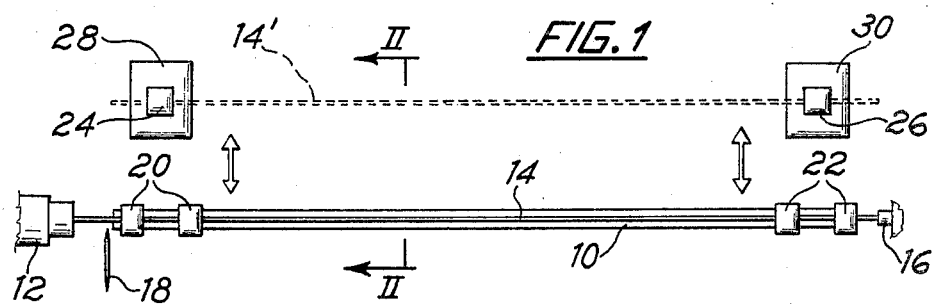
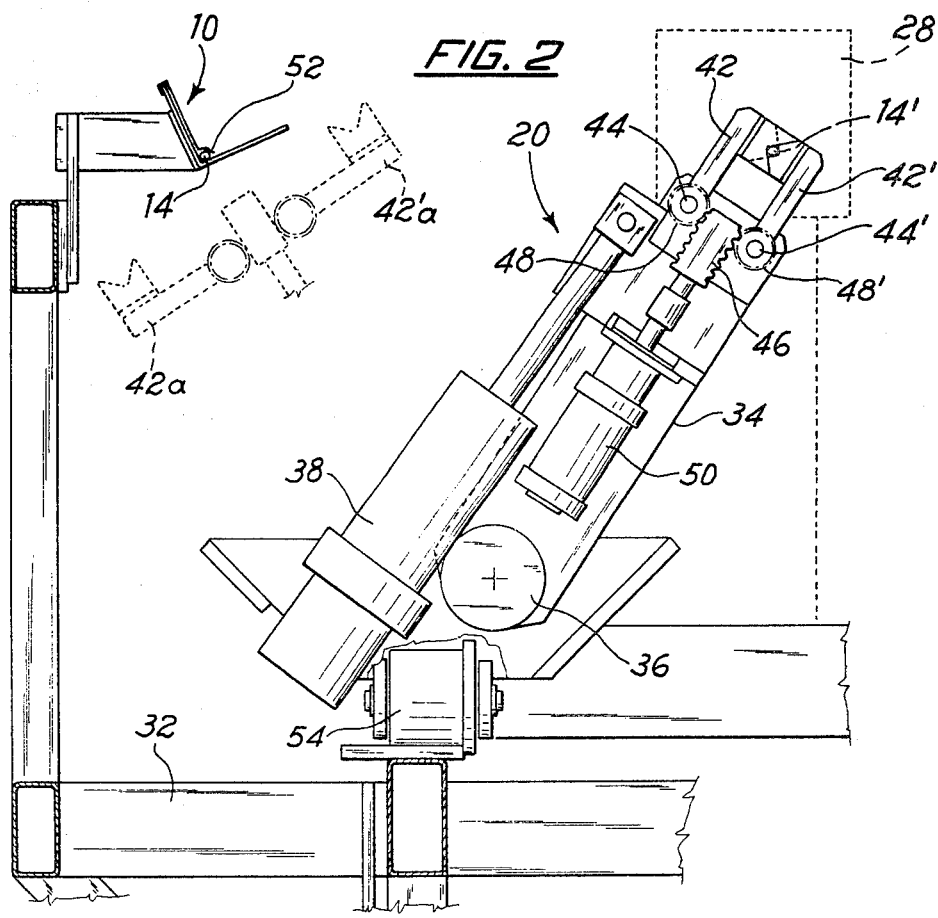
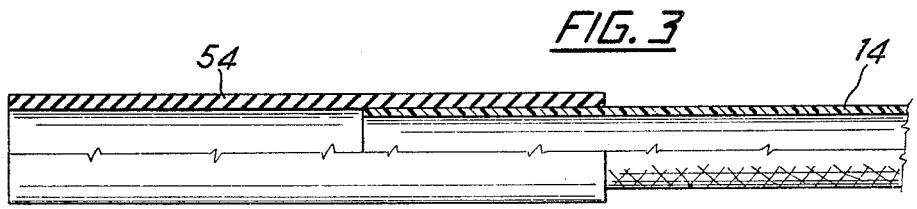

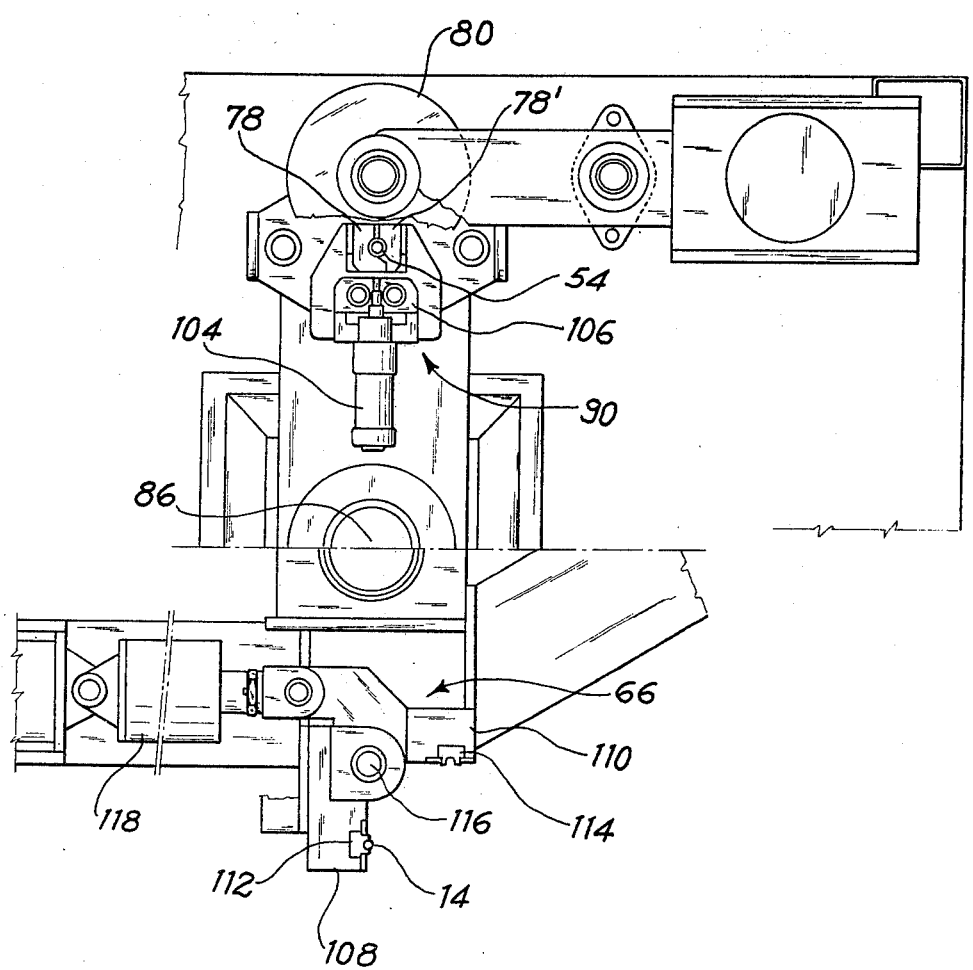

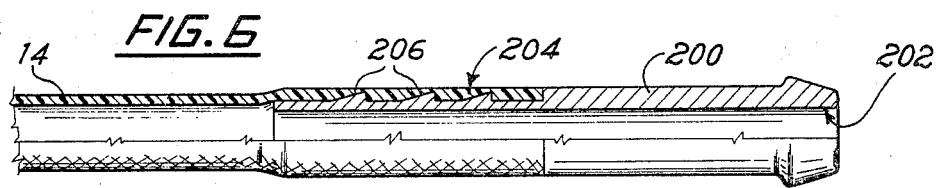
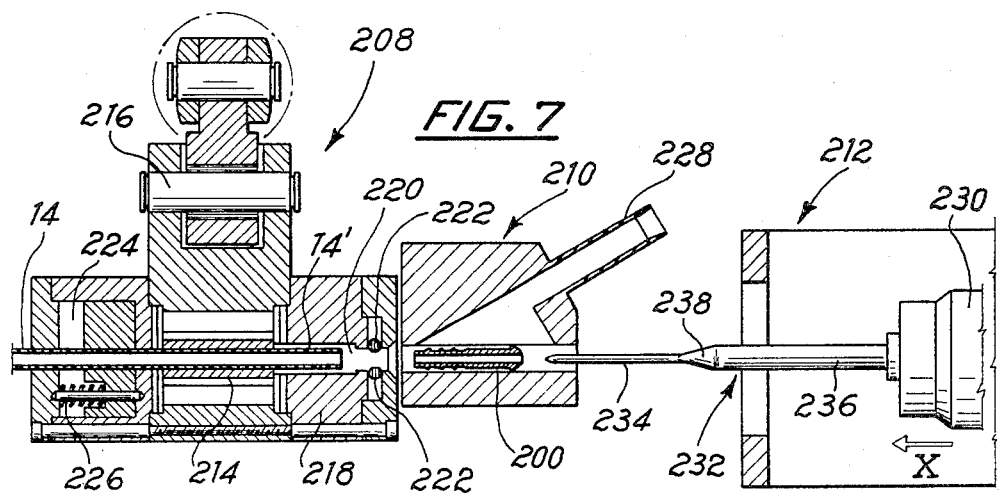
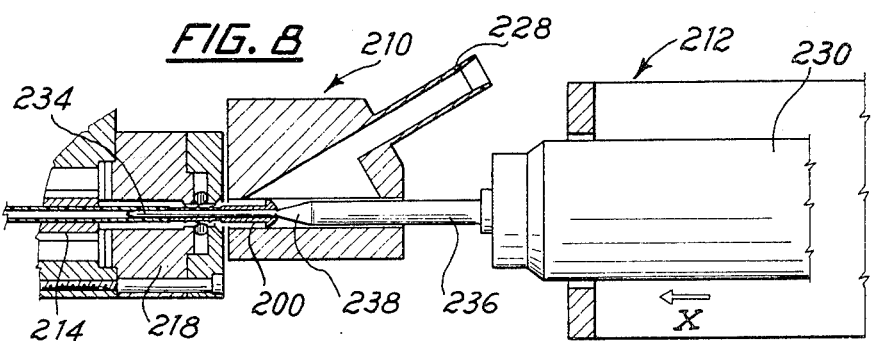
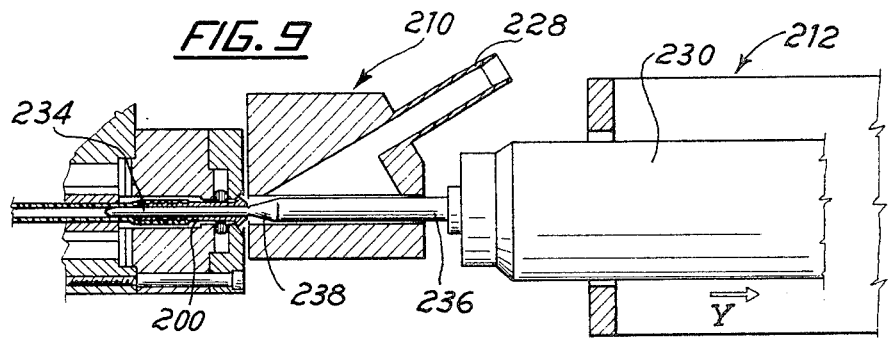

PLASTIC TUBE ELEMENT MANUFACTURING APPARATUS

BACKGROUND OF THE INVENTION

1. Field of the Invention

This invention relates to an apparatus for automatically manufacturing plastic tubular elements having at least one end fitting, such elements being suitable for conveying liquids, in particular fuel for motor vehicles.

More particularly, this invention relates to an apparatus for automatically performing the operations of exactly cutting a given length of a tube of plastic material, preferably a thermoplastic material and in particular nylon, and of mounting on at least one of the cut tube ends, a fitting in the form of a rubber coupling or a metal insert. According to the foreseen uses, the mounting operation is carried out in such a manner as to ensure all necessary liquid sealing features under the stresses to which and tube and fitting will be subjected during the use of the motor vehicle.

2. Description of the Prior Art

Many methods and devices for performing operations of the type referred to are well known in the art, such devices usually being hand operated and including tube retaining jaws wherein a tube end is hand positioned and retained, means for positioning and retaining a fitting in a position co-axial with the tube end, and lever or cylinder-piston means for axially pushing the fitting within or onto the tube end. The tube or fitting end is open to respectively receive the fitting or tube by means of chamfers normally provided on the outer or inner edges of the fitting end.

The above known methods and devices are very expensive as they require manual operations and thereby provide very limited outputs. Further, these methods and devices carry out an insertion operation which is not reliable with reference to the hydraulic sealing of couplings, and often allow a mutual movement of the inserted means, so that separate sealing and retaining elements are required.

SUMMARY OF THE INVENTION

According to this invention, a new apparatus is now provided which makes it possible to carry out the above stated operations in a completely automatic manner, with a high output and with a maximum of reliability in the connection features of the tube and fitting.

This apparatus is essentially characterized in that it includes: a rectilinear conveyor with a length which can be preset, for conveying a tubular element; a feeder for advancing the tubular element within the conveyor; a limit stop switch at the end of the conveyor, which is operated by the tubular element and which stops feeder; a tubular element cutting device at the fore end of the conveyor, which is operated by the limit stop to cut a preset length of tubular element; and at least a pair of jaws to draw the tubular element length near the ends thereof and to position the ends near operating heads for mounting a fitting or fittings.

BRIEF DESCRIPTION OF THE DRAWINGS

FIG. 1 is a diagrammatic view showing the operating principles of the apparatus of the invention.

FIG. 2 is a side sectional view, along the line II—II of FIG. 1, and showing the design of the tubular element transferring jaws.

FIG. 3 is an axial cross-section showing a tubular element end with a rubber coupling mounted thereon.

FIG. 5 is a cross-section along the line V—V of FIG. 4.

FIG. 6 is an axial cross-section showing a tubular element end with a metal fitting inserted thereinto.

FIG. 7 is a partial side view, with parts in section and parts diagrammatically shown, of an operating head for inserting metal fittings as shown in FIG. 6.

FIGS. 8 and 9 are partial views of the same head in two succesive insertion steps.

DESCRIPTION OF THE PREFERRED EMBODIMENTS

Figure 4:
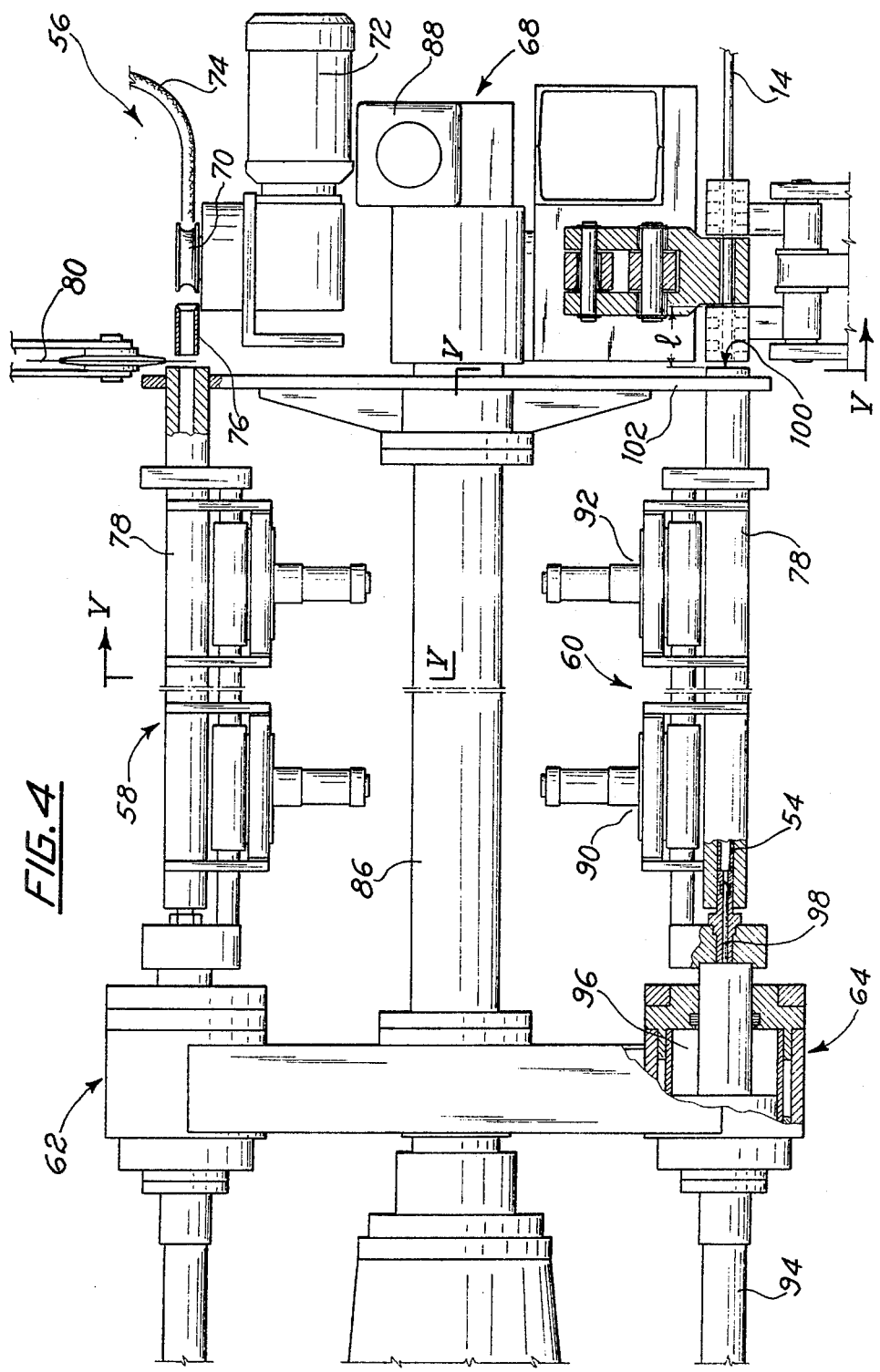
FIG. 4 is an axial cross-section showing an operating head wherein rubber couplings according to FIG. 3 are prepared and mounted on a tubular element end.

With reference to FIG. 1, the diagrammatically shown apparatus essentially comprises a conveying guide 10, for instance having the shape as shown in FIG. 2, wherein a tubular element is advanced by means of a feeding device 12, the tubular element being preferably in the form of a small tube 14 of nylon with pre-set inner and outer sections and particularly suitable for fuel conveyance. Conveyor 10 is rectilinear and has a length which can be pre-set for instance by adding or removing one or more pieces thereof between its ends. Immediately downstream of conveyor 10 and in alignment therewith is a limit-stop switch 16 which is operated by the free end of advancing tube 14 to place feeding device 12 in its off position, to stop further tube advancements, and to place a cutting device 18, for instance with rotatable a and movable blade, in its on position for size-cutting the tube 14. Limit stop 16 further operates two pairs of jaws 20,22 which grasp the tube 14 near the ends thereof, through openings of conveyor 10, and move the tube, always in its rectilinear condition, to a spaced position 14', wherein the tube ends are now grasped by further jaw pairs 24,26 appertaining to fitting mounting heads, jaws 20,22 being then opened and returned back to their starting position wherein they are ready for drawing another length of tubular element 14.

Heads 28 and 30, which can jointly or separately operate, are provided to mount a rubber or metal fitting on or into the respective ends of tube 14.

FIG. 2 exemplifyingly shows one of jaws 20, 22 for transferring the tube 14. Jaw 20 is fixed on a conveyor support 32 and comprises an arm 34 which is able to oscillate around an axis 36 under the control of a cylinder-piston assembly 38 sidewardly mounted on arm 34 and pivotally fixed thereto. Arm 34 carries two grasping elements 42,42' pivoted at 44,44' and controlled by a rack 46 meshing with pinions 48,48', rack 46 being in turn operated by a cylinder-piston assembly 50.

When the two cylinder-piston assemblies 38,50 are operated, grasping elements 42,42' are moved to their positions 42a, 42a' and then are closed on tube 14. When the jaws are closed, the cylinder-piston assembly 38 is further operated to rotate the closed jaws and arm 34 to the position shown by full lines in FIG. 2, where the tube 14 is taken by jaws 24 and 26.

Grasping elements 42,42' are then opened and arm 34 is moved back to its starting position.

As it can be shown in FIG. 2, the tube 14 can be withdrawn from the conveyor 10 thanks to the presence of a resilient tube retaining element 52. Further, the assembly of jaws 20, 22 is mounted on wheels, reels or slides in order to allow a setting of its position along the conveyor 10 in order to match the same to a pre-set length of conveyor 10 and cut tube 14.

As above mentioned, the heads 28 and 30 can mount both rubber and metal fittings. Rubber fittings are in the form of couplings as shown at 54 FIG. 3, and are to be forced on one or both ends of tube 14 in such a manner as to warrant the best reliability of the resultant liquid seals under the stresses and vibrations of motor vehicles.

A head for mounting rubber couplings 54 is shown in detail in FIGS. 4 and 5.

This head is essentially formed by a coupling feeding and cutting device 56, a pair of coupling housing and retaining devices 58 and 60, a pair of coupling mounting devices 62,64 cooperating with the above devices 58,60, a jaw 66 for retaining the tubular element 14, and a means 68 for rotating devices 58,62 and 60,64 from a coupling housing position to a coupling inserting position. Otherwise stated, the couplings are prepared in a first position or station, corresponding to that shown of devices 56,58 and 62, wherein they are held by suitable jaws, and then the couplings are transferred to the shown position of devices 60,64, coaxially with tube 14, on which they are forcibly mounted. The devices are rotated by control means 68 which operates in synchronism with the other apparatus devices under the control of suitable counters and timers.

The feeding device 56 comprises feeding rollers 70 which are acted upon by a motor 72 and withdraw a rubber tube 74 from a reel thereof (not shown) to feed the same through a centering element 76, to a guide 78 wherein the tube is inserted in a rectilinear condition. A counter or timer (not shown) cooperates with rollers 70 and controls stopping thereof when a preset length of tube 74 is inserted into guide 78, as well as the movement of a cutter 80 which cuts the tube under the action of a reciprocating cylinder-piston assembly.

Accordingly, guide 78 houses a length of tube 74, which will form a coupling 54 and retains the same by two guide jaw portions which can be opened and closed under suitable control means, for instance pneumatic means 90,92.

When the coupling is retained, the head is rotated around its axis 86 by means of a cylinder-piston assembly 88, which forms rotating means 68, until bridging the coupling in axial alignment with the end of tube 14, in the position of device 60.

Tube 14 has been previously transferred from jaws 20 to jaw 66 (corresponding to jaw 24 of FIG. 1) which will be better explained later on with reference to FIG. 5, while jaws 20 have been kept away from the head. When retained in jaw 66, tube 14 has a free end protruding for a given length 1 toward guide 78 having coupling 54 housed and retained therein.

The coupling insertion on the tube free end is carried out in two steps by means of a device 64 (or 62) essentially formed by two cylinder-piston assemblies 94 and 96, the first of which operates in order to insert through coupling 54 and the tube end at least beside and before closure of jaw 66, a metal core 98 which guides the coupling and tube end during insertion thereof and forms a rigid support for the jaws. When this core insertion has been carried out, the jaws forming guide 78 are further closed on coupling 54 by means of assemblies 90,92, and jaw 66 is further closed on tube 14. The insertion operation is then carried out by means of the cylinder-piston assembly 96 which forwardly pushes guide 78, together with operating means 90-92, until bringing a guide front portion 100 near jaw 66, and sliding guide 78 into an opening of support wall 102. This operation makes it possible to obtain the coupling insertion on the tube end with the required warranties of sealing and reliability.

The core 98 is then retracted and the jaws of guide 78, as well as jaw 66, are opened to completely make free the end product and to allow recovery thereof. Of course, during the coupling insertion the apparatus carries out the preparatory steps of forming a new coupling and preparing a new length of tube 14, in order to reach a high production rate.

FIG. 5 shows the form of jaws 78,78', forming a coupling guide, which are acted upon by a cylinder-piston assembly 104 through a toggle lever mechanism 106 and are moved to their maximum closure position after insertion of core 98 into coupling 54.

The lower part of FIG. 5 shows jaw 66, having two arms 108,110 with tipped blocks 112,114 to retain tube 14, arm 110 being rotatable about an axis 116 under the control of a cylinder-piston assembly 118.

It is to be understood that the other head 30 (FIG. 1) of the apparatus can simultaneously carry-out the same coupling inserting operation on the other end of tube length 14, or can be kept inoperative, or else can mount a metal fitting as shown in FIGS. 6 to 9.

This metal fitting 200 has an inner through passage 202, and at least a portion of its outer wall 204, which will contact the inner wall of tube 14, is provided with a plurality of projections, preferably in the form of a series of saw teeth 206.

In order to carry out the fitting insertion as shown in FIG. 6, a head is provided which essentially comprises (FIG. 7) a tube end retaining and positioning assembly 208, a fitting feeding assembly 210 to feed a single fitting in coaxial relationship with a tube end, and an operating assembly 212 to insert the fitting in the tube end.

The retaining and positioning assembly 208 essentially comprises a jaw which can be controllably opened and closed, for instance by rotation around a pin 216 in a manner similar to that of jaw 66, in order to receive the end of tube 14, to retain the same until the insertion operation has been performed, and then to make free the tube for further operations. Jaw 214, when closed on the tube, leaves an end portion 14' thereof freely protruding, tube portion 14' having a length at least equal to the fitting portion to be inserted and being housed in a tube centering means 218 which comprises a tube guide 220 and a centering element in the form of a bushing or a sphere crown 222, each of which is resiliently pushed toward the passage axis in order to center the fitting 200 during insertion thereof. On the opposite side, further jaws 224 retain said tube 14 and are axially shiftable together with the tube in order to signal, by means of an end-stroke element 226, any undesired axial movement of tube 14 during the fitting insertion, above a given limit.

The assembly 210 for feeding fitting 200 comprises a store (not shown) and a known loader 228 which feeds fittings 200 in the shown position, co-axially with the tube 14.

The assembly 212 comprises an axial advacement group (not shown) for instance of the cylinder-piston type which can advance a housing 230 wherein a motor and a rotating tool 232 are housed, tool 232 exteriorily protruding in a position coaxial with tube 14 and fitting 200. Tool 232 comprises a rod-shaped end 234, which can be inserted into passage 202 of fitting 200 and into the bore of tube 14, as well as a widened portion 236, with conical connection 238 to rod 234 by which the outer rearward surface of fitting 200 is engaged in order to move the fitting in an axial direction and to rotate the same by friction engagement. Housing 230 further comprises a clutch device which is responsive to the axial forces to rotate tool 232 when this latter encounters a preset resistance during its motion in the direction x of FIG. 7.

In order to carry-out the insertion, a fitting 200 is housed in the loader 228 and the tube end 14 is retained by jaw 214. Thereafter the tool 232 advances and penetrates with its rod portion 234 within opening 202 of fitting 200 (FIG. 8) and within the bore of tube 14. During the tool advancement the conical portion 238 of tool 232 engages with fitting 200 and axially pushes the same until contacting with tube 14. When fitting 200 and tube 14 are in mutual contact, any further axial advancement in the direction X of assembly 212 operates the above stated clutch device, so that tool 232 is rotated about its axis.

The fitting 200 is then axially pushed into the tube 14 and simultaneously rotated at a speed sufficient to obtain a partial softening of the inner surface of tube 14 by friction with the outer surface of fitting 200, so that such inner surface may adapt and be bonded to such outer surface on cooling thereof. This bonding condition happens at the end of the insertion operation, which is defined by a suitable end-stroke means acting on assembly 212 to reverse the movement direction of tool 232 to the direction y, and to stop rotation thereof. When tool 232 leaves the inserted fitting 200, the bond between the fitting and the tube is complete and the tube can be made free by opening jaw 214.

According to contemplated uses, it is possible to have a purely axial insertion of the metal fitting. In this occurence, the fitting outer surface preferably carries saw teeth 206 with sharp edges and in a direction opposite to the direction of insertion, while the apparatus would not include the above discussed means for rotating tool 232.

If, during the insertion operation, the axial thrust on tube 14 overcomes the retaining force of jaw 214 on tube 14 and causes axial shifting of the tube, this shifting is revealed by jaw 224 and end-stroke element 226, this latter signalling an anomalous operating condition and allowing rejection of the product.

It is be understood that the above described embodiments may undergo to many modifications without departing from the spirit and scope of this invention.

I claim:

1. An apparatus for automatically forming plastic tubular members of predetermined length and for connecting a coupling to at least one end thereof, said apparatus comprising:
   a rectilinear conveyor guide;
   feed means for feeding plastic tubing along said conveyor guide;
   detector means for detecting when a predetermined length of said tubing has been fed onto said conveyor guide and then for stopping said feed means;
   cutter means for, upon stopping said feed means, cutting said tubing to thereby form a plastic tubular member of predetermined length;
   means for transferring said tubular member from said conveyor guide to a coupling connection position;
   means at said coupling connection position for gripping said tubular member against axial movement thereof;
   means for supplying a coupling to said coupling connection position and for aligning said coupling axially of an end of said tubular member;
   a mandrel; and
   connecting means at said coupling connection position for inserting said mandrel through said coupling, for inserting said mandrel into said end of said tubular member, for moving said coupling through a first movement axially toward said end of said tubular member before connection therebetween, and for further moving said coupling through a second movement axially of said end of said tubular member and achieving connection therebetween.

2. An apparatus as claimed in claim 1, wherein said coupling supplying means comprises means for supplying flexible couplings of a size to fit over said end of said tubular member, and said connecting means comprises means for axially forcing said flexible coupling over said end of said tubular means.

3. An apparatus as claimed in claim 2, wherein said gripping means comprises a jaw gripping said tubular member adjacent said end thereof but leaving uncovered a predetermined length thereof, and said connecting means comprises jaw means for gripping said coupling in coaxial alignment with said end of said tubular member, first assembly means for inserting said mandrel through said coupling and into said end of said tubular member, and second assembly means for moving said coupling through said first and second movements axially of said end of said tubular member.

4. An apparatus as claimed in claim 3, wherein said jaw means and said first assembly means are mounted on a support which is movable between said coupling connection position and a coupling supply position.

5. An apparatus as claimed in claim 4, wherein said coupling connection position and said coupling supply position are mounted for rotary movement therebetween at an angle of 180°.

6. An apparatus as claimed in claim 4, wherein said coupling supplying means comprises means for feeding a length of flexible coupling material to said jaw means at said coupling supply position, means for metering a predetermined length of said flexible coupling material, means for severing said predetermined length of flexible coupling material to thus form said coupling, and means for moving said support with said jaw means gripping said coupling to said coupling connection position.

7. An apparatus as claimed in claim 1, wherein said coupling supplying means comprises means for supplying a single metal coupling of a size to fit within said end of said tubular member, and said connecting means comprises assembly means for axially forcing said metal coupling into said end of said tubular member while rotating said metal coupling.

8. An apparatus as claimed in claim 7, wherein said assembly means includes an axially movable housing supporting a rotatable rod, said mandrel extending from said rod.

* * * * *